US008568618B2

(12) United States Patent
Fichtner et al.

(10) Patent No.: US 8,568,618 B2
(45) Date of Patent: Oct. 29, 2013

(54) CATHODE MATERIAL FOR FLUORIDE-BASED CONVERSION ELECTRODES, METHOD FOR THE PRODUCTION THEREOF AND USE THEREOF

(75) Inventors: Maximilian Fichtner, Oftersheim (DE); Horst Hahn, Seetheim-Jugenheim (DE); Raju Prakash, Eggenstein-Leopoldshafen (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 127 days.

(21) Appl. No.: 13/263,972

(22) PCT Filed: Apr. 3, 2010

(86) PCT No.: PCT/EP2010/002147
§ 371 (c)(1),
(2), (4) Date: Oct. 11, 2011

(87) PCT Pub. No.: WO2010/115601
PCT Pub. Date: Oct. 14, 2010

(65) Prior Publication Data
US 2012/0032118 A1  Feb. 9, 2012

(30) Foreign Application Priority Data
Apr. 11, 2009  (DE) .................. 10 2009 017 262

(51) Int. Cl.
*H01M 4/82* (2006.01)
*H01M 6/00* (2006.01)
*H01B 1/04* (2006.01)

(52) U.S. Cl.
USPC .......... 252/503; 29/623.1; 252/500; 252/506; 252/518.1; 429/231.9; 429/231.95; 977/734; 977/752

(58) Field of Classification Search
USPC .......... 29/623.1; 252/182.1, 503, 518.1, 506, 252/500; 423/490; 429/220, 221, 223, 224, 429/225, 231.5, 231.9, 231.95; 977/734, 977/752
See application file for complete search history.

(56) References Cited

U.S. PATENT DOCUMENTS 6,465,132 B1  10/2002 Jin
6,946,110 B2   9/2005 Nishimura et al.
(Continued)

FOREIGN PATENT DOCUMENTS

WO   WO 2004/051772 A2   6/2004

OTHER PUBLICATIONS

Raju Prakash, Ajay Kumar Mishra, Arne Roth, Christian Kübel, Torsten Scherer, Mohammad Ghafari, Horst Hahn and Maximilian Fichtner, A ferrocene-based carbon—iron lithium fluoride nanocomposite as a stable electrode material in lithium batteries, J. Mater. Chem., 2010, 20, 1871-1876.*

(Continued)

*Primary Examiner* — Bijan Ahvazi
(74) *Attorney, Agent, or Firm* — Venable LLP; Robert Kinberg

(57) ABSTRACT

A cathode material for fluoride-based conversion electrodes includes a matrix of graphite nanocarbon containing a dispersion of alkali metal ions, fluoride ions and metal nanoparticles with maximum particle sizes of 20 nm. Further there is provides a method for such cathode material that includes heating a metal and an organic compound during a single thermal treatment step until the organic compound is decomposed; and adding an alkali metal fluoride either before or after the thermal treatment step to the organic compound. Finally, there is provided a method of making an alkali metal ion battery, that includes utilizing the aforesaid cathode material for a fluoride-based conversion electrode in the battery.

11 Claims, 4 Drawing Sheets

(56) References Cited

U.S. PATENT DOCUMENTS

| | | |
|---|---|---|
| 2003/0108480 A1 | 6/2003 | Baker et al. |
| 2004/0121235 A1* | 6/2004 | Amatucci ................ 429/231.95 |
| 2006/0035148 A1 | 2/2006 | Balaya et al. |

OTHER PUBLICATIONS

International Search Report of PCT/EP2010/002147 Dated July 22, 2010 With an English Translation.

Badway, F., et al., "Carbon-Metal Fluoride Nanocomposites". Journal of the Electrochemical Society, 150 (9) A1209-A1218 (2003).

Badway, F., et al., "High-Capacity Reversible Metal Fluoride Conversion Materials as Rechargeable Positive Electrodes for Li Batteries", Journal of the Electrochemical Society, 150 (10) A1318-A1327 (2003).

Prakash, R., et al., "A ferrocene-based carbon-iron lithium fluoride nanocomposite as a stable electrode material in lithium batteries", J. Mater. Chem., 2010, 20, 1871-1876 (2010).

Tarascon, J.-M., et al., "Issues and challenges facing rechargeable lithium batteries", Mature, vol. 414, pp. 359-367, 2001.

Chung, Sung-Yoon, Electronically conductive phospho-olivines as lithium storage electrodes, Nature Materials, vol. 1, pp. 123-128, 2002.

K. Kang, et al., "Electrodes with High Power and High Capacity for Rechargeable Lithium Batteries", Sciencemag.org, pp. 976-980, 2011.

Armand, M., et al., "Building Better Batteries",Nature Publishing Group, vol. 451, pp. 652-657, 2008.

Oumellal, Y., et al., "Metal Hydrides for Lithium-ion Batteries", Nature Materials, vol. 7, pp. 916-921, (2008).

Bruce, Peter G., et al., "Nanomaterials for Rechargeable Lithium Batteries", Angew, Chem. Int. Ed. vol. 47, pp. 2930-2946 (2008).

Arai, Hajime, et al., "Cathode Performance and Voltage Estimation of Metal Trihalides", Journal of Power Sources 68, pp. 716-719 (1997).

Bervas, M., et al., "Bismuth Fluoride Nanocomposite as a Positive Electrode Material for Rechargeable Lithium Batteries", Electrochemical and Solid-State Letters, 8(4), pp. A179-A183 (2005).

Li, Hong., et al., "Reversible Formation and Decomposition of LiF Clusters Using Transition Metal Fluorides as Precursors and Their Application in Rechargeable Li Batteries", Adv. Mater, vol. 15, No. 9, pp. 736-739 (2003).

Makimura, Yoshinari, et al., "Pulsed Laser Deposited Iron Fluoride thin films for Lithium-ion Batteries", Applied Surface Science 252, pp. 4587-4592 (2006).

Makimura, Y., et al., "Electrochemical Behaviour of Low Temperature Grown Iron Fluoride Thin Films", Electrochemistry Communications 8, pp. 1769-1774 (2006).

Leonhardt, Albrecht, et al., "Synthesis, Properties, and Applications of Ferromagnetic-Filled Carbon Nanotubes", Chem. Vap. Deposition, vol. 12, pp. 380-387 (2006).

Ebbesen, T.W., et al., "Large-Scale Synthesis of Carbon Nanotubes", Nature, vol. 358, pp. 220-222 (1992).

Thess, Andreas, et al., "Crystalline Ropes of Metallic Carbon Nanotubes", Science, vol. 273, pp. 483-487 (1996).

Jose-Yacaman, M., et al., "Catalystic Growth of Carbon Microtubules with Fullerene Structure", Appl. Phys. Lett. 62 (6), pp. 657-659 (1993).

Nikolaev, Pavel., et al., "Gas-phase Catalytic Growth of Single-Walled Carbon Nanotubes from Carbon Monoxide", Chemical Physics Letters 313, pp. 91-97, (1999).

Hu, Yong-Sheng, et al., "Synthesis of Hierarchically Porous Carbon Monoliths with Highly Ordered Microstructure and Their Application in Rechargeable Lithium Batteries with High-Rate Capability", Adv. Funct. Mater, 17, pp. 1873-1878 (2007).

\* cited by examiner

CATHODE MATERIAL FOR FLUORIDE-BASED CONVERSION ELECTRODES, METHOD FOR THE PRODUCTION THEREOF AND USE THEREOF

CROSS-REFERENCE TO RELATED APPLICATIONS

This application is a National Stage of International Application No. PCT/EP2010/002147, filed Apr. 3, 2010, designating the United States and claiming priority to German Application No. DE 10 2009 017 262, filed Apr. 11, 2009.

BACKGROUND OF THE INVENTION

The invention relates to a cathode material for fluoride-based conversion electrodes, a method for producing said material and its use.

Future mobile and portable device applications require secondary batteries with high energy densities, wherein batteries operating on the basis of the lithium-ion exchange are particularly suitable for this. J.-M. Tarascon and M. Armand, Nature 414, p. 359, 2001; S.-Y. Chung et al., Nature Materials 1, p. 123, 2002, K. Kang et al., Science 311, p. 977, 2006, as well as M. Armand and J.-M Tarascon, Nature 451, p. 652, 2008 conducted experiments in this field and developed materials which can reversibly store lithium.

Batteries of this type contain cathode materials with layered structures or, optionally, provide the option of storing lithium, especially $LiCoO_2$, $LiMnO_2$ and $LiFePO_4$. With working voltages of 3.3-4.0 V, they have for the most part specific capacities of 90-140 mAh/g. Intercalation materials such as $LiNiO_2$ and $LiMn_2O_4$ are of interest because they are cheaper and have a lower environmental impact. However, higher storage densities are not reported. On the anode side, graphite and related carbon materials are primarily used as highly reversible intercalation systems for lithium, thus making it possible to achieve specific capacities of up to 373 mAh/g.

Given this background, it is the goal of the present invention to develop new batteries which can be produced cost-effectively, have a low impact on the environment, can be handled safely and exhibit little sensitivity to temperature influences, have a lasting element composition, permit a high cycle number and have a high gravimetric (Wh/kg) as well as a high volumetric energy density (Wh/l).

It was recently discovered that especially high energy densities can be achieved when using electrode materials which operate on the basis of conversion materials instead of storage materials. On the anode side, Y. Oumellal et al., Nature Materials 7, p. 916, 2008 and P. G. Bruce et al., Angew. Chem. Int. Ed. [Applied Chemistry, Int. Ed.] 47, p. 2930, 2008, have already achieved first successes with oxides such as $SnO_2$ or $MoO_3$ and metal hydrides. In those cases, it was demonstrated that the active material is reduced to the metal, wherein a lithium compound is formed parallel thereto. During the dilithiation, the direction of the reaction is reversed and the metal is again oxidized.

On the cathode side, conversion materials on the basis of metal fluorides offer high theoretical potentials which can reach up to 2000 mAh/g, wherein the following reversible electro-chemical reaction in principle takes place in the process:

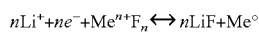

Metallic lithium consequently reacts during the discharging operation with the fluoride of a transition metal Me, thereby forming lithium fluoride and the transition metal. The anode consists of lithium, e.g. in metallic form or intercalated into graphite, while the cathode consists of metal fluoride and a conductive carbon material.

H. Arai, Sh. Okada, Y. Sakurai, J. Yamaki in J. Power Sources, 68, p. 716, 1997, for the first time report on the high theoretical potential of metal trifluorides. However, at room temperature and using an electrode material composed of $FeF_3$ and acetylene soot, they achieved only a specific capacity of 80 mAh/g.

Higher capacities were described in the document US 2004/0121235 A1 and by F. Badway et al. in J. Electrochem. Soc. 150, p. A1209, 2003, and in J. Electrochem. Soc. 150, p. A1318, 2003 for a carbon-metal composite, for example composed of 85% by weight $FeF_3$ and 15% by weight C, which allowed achieving a specific capacity of 200 mAh/g at room temperature, corresponding to the reversible reaction of $Fe^{3+}$ to $Fe^{2+}$ in the range of 2.8-3.5V. The improved properties as compared to Arai et al. were attributed to the fact that the metal fluoride in said case was present in a smaller grain size and that it was thoroughly mixed with a conductive carbon material. Different amounts of graphite, soot and active carbon were mixed with the metal fluoride and the resulting mixture was ground for several hours in a high-energy ball grinder. The resulting crystallite size for the $FeF_3$ was listed as 30-50 nm. Specific capacities of up to 560 mAh/g could be achieved in this way. However, the ability of the material to cyclize was limited and the measurements had to be taken at 70° C. because of the poor kinetics of the electrode processes at room temperature. The document US 2004/0121235 A1 furthermore discloses that nanocomposites composed of lithium fluoride, a transition metal and elementary carbon can be used as reversible electrode material.

Bervas et al., Electrochem. Solid State Lett. 8, p. A179, 2005 report on a reversible reaction of a $BiF_3$/C nanocomposite by forming Bi and LiF at a specific capacity of 230 mAh/g. However, this material also does not exhibit good cycle properties.

With the example of $TiF_3$ and $VF_3$, H. Li, G. Richter and J. Maier, Advanced Materials 15, p. 736, 2003, demonstrated that transition metals which form alloys with lithium can be cyclized better and allow higher cycle numbers than other metals such as iron which do not form alloys and quickly lose capacity. A specific capacity of up to 500 mAh/g after 10 cycles was reported for $TiF_3$ and $VF_3$ cathodes, wherein the electrode material was produced with the aid of ball grinders and using the starting materials.

In App. Surf. Sci. 252, p. 4587, 2006 and in Electrochem. Commun. 8, 1769, 2006, Makimura et al. report on the production of a $FeF_3$ film which is thinner than 1 μm and was deposited via pulsed laser desorption onto a substrate cooled to −50° C. Additional films, deposited at 600° C., were composed of $FeF_2$. The two films differed in their initial electrochemical behavior but adapted after several cycles to the behavior of the $FeF_2$.

The methods used so far to produce cathode materials used in fluoride-based batteries required that the constituents were either mechanically alloyed with the aid of high-energy ball grinders or were deposited with the aid of thin-film processes. These methods obviously result in limited cyclization, restrictions in the material selection, and a lowering of the measured specific capacity. The use of metal fluoride cathodes is therefore made more difficult as a result of partial irreversibility of the electrode processes and poor cycle properties.

Leonhardt et al. disclose in Chemical Vapor Deposition 12, p. 380, 2006, that gaseous ferrocene subjected to a carrier gas process will have decomposed completely at temperatures above 500° C., in accordance with the following reaction:

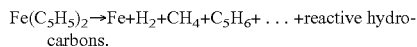

Depending on the flow rate for the carrier gas, the iron clusters behave in the manner of catalytically functioning nuclei for producing different types of nanocarbons, also including single-wall or multi-wall carbon nanotubes and hollow carbon fibers, which grow on the catalyst nuclei.

Additional techniques for producing nanocarbon materials include the arc discharge (see Ebessen et al., Nature 358, p. 220, 1992), the laser ablation (see Thess et al., Science 273, p. 483, 1996) and the chemical vapor deposition (CVD; see Jose-Yacaman et al., Appl. Phys. Lett. 62, p. 657, 1993) as well as the so-called HiPco process (Nikolaev et al., Chem. Phys. Lett. 313, p. 91, 1999).

A method for producing carbon fibers is known from the document U.S. Pat. No. 6,946,110 B2, wherein benzene is decomposed in an inert gas flow at 1200° C., in the presence of an organic compound and a transition metal catalyst.

Hu et al., Adv. Func. Mater. 17, p. 1873, 2007, demonstrated that using a micro-porous and nano-porous carbon material offers advantages for the electro-chemical applications. The carbon material described therein was produced with the aid of an involved template process and using a $SiO_2$ matrix.

According to the document U.S. Pat. No. 6,465,132 B1, carbon nanofibers and nanotubes are produced from ferrocenes with the aid of reactions taking place in a gas mixture which is conducted with a carrier gas through a typical CVD [chemical vapor deposition] reactor of quartz glass. It is critical for this operation that a plurality of reaction parameters are adhered to precisely, in particular the temperature, the reaction time, the concentration of the precursor, and the flow rate of a carrier gas.

SUMMARY OF THE INVENTION

Starting with this premise, it is an object of the present invention to propose a cathode material for fluoride-based conversion electrodes, a method for producing the material and the use thereof which do not have the aforementioned disadvantages and restrictions.

In particular, a material is to be made available which can be used directly as cathode material for fluoride-based conversion electrodes and which shows very stable behavior with simultaneously high capacity, even at room temperature, over a plurality of charging and discharging cycles.

It is a further object to provide a method which in particular allows the easy and cost-effective production in a single step of nanocomposites for a cathode material of this type, using precursor materials or mixtures thereof.

The above and other objects may be achieved by providing a cathode material for fluoride-based conversion electrodes, which according to one embodiment comprise: a matrix of graphite nanocarbon containing a dispersion of alkali metal ions, fluoride ions and metal nanoparticles with maximum particle sizes of 20 nm.

According to a further aspect of the invention there is provided a method for producing a cathode material for a fluoride-based conversion electrode, the method in one embodiment, comprising: heating a metal and an organic compound during a single thermal treatment step until the organic compound is decomposed; and adding an alkali metal fluoride either before or after the thermal treatment step to the organic compound.

According to yet another aspect of the invention there is provided a method of making an alkali metal ion battery, that comprises utilizing the aforesaid cathode material for a fluoride-based conversion electrode in the metal ion battery.

The cathode material according to the invention for fluoride-based conversion electrodes may include:

alkali-metal ions, preferably lithium ions or sodium ions,
  fluoride ions, as well as
  metal nanoparticles with a maximum particle size of 20 nm,
  which are distributed in a matrix of graphite nanocarbon material, for example, nanocarbon material containing multiple walls (multi-wall).

A cathode material according to the invention for fluoride-based conversion electrodes can be produced with the following method which differs from the currently used methods or processes for producing nanocarbon materials.

For this method, a component which is composed of a metal, preferably a transition metal and especially preferred Ti, V, Cr, Mn, Fe, Co or Ni, and an organic compound, is advantageously heated in a closed reactor until the organic compound has decomposed. An alkali-metal fluoride is mixed in, for example, through grinding in a ball grinder, either before or after the thermal treatment step.

One variant of the method according to the invention provides that the component comprising the metal and the organic compound is converted together with the alkali-metal fluoride in a single thermal treatment process.

According to a second variant of the inventive method, the component comprising the metal and the organic compound is subjected to a single thermal treatment step and is subsequently mixed with the alkali-metal fluoride.

The component necessary for realizing the method according to the invention comprises a metal and an organic compound in the form of a single chemical compound, for example, a metallocene, or in the form of a metal salt which is dispersed in a matrix of an organic compound.

In one embodiment, a metallocene may be used, meaning a chemical compound with a structure that contains a metal as well as an organic compound. Dry metallocene powders, especially ferrocene, cobaltocene, nickelocene or titanocene, or a mixture of these metallocenes and an alkali-metal fluoride, in particular lithium fluoride or sodium fluoride, are thus filled under an inert gas atmosphere into a reactor (steel container) and are preferably sealed in. The reactor together with its content is subsequently heated to the desired temperature, preferably ranging from 600° C. to 800° C. Insofar as an alkali-metal fluoride was not added right from the start, it is added later on, preferably with the aid of grinding in a ball grinder. According to one alternative embodiment, the herein described reaction takes place in an open container.

The aforementioned educts are optionally mixed with additional active conditioning agents, in particular binders and other lead compounds.

According to yet another embodiment, a highly dispersed mixture (dispersion) of a metal salt in a polymer or monomer matrix is used for the organic compound and is subjected to a thermal treatment, as described.

According to still another embodiment, a highly dispersed mixture (dispersion) of a metal salt in a matrix of a biological material, preferably a plant or animal material and in particular gelatin, is used for the organic compound and is subjected to a thermal treatment.

The nanocomposite produced with this method and containing alkali-metal fluoride consists of an arrangement of orderly arranged, preferably multiwalled graphite structures comprising hollow structures and compact structures, which are in close contact with the metal nanoparticles, in particular Ti, V, Cr, Mn, Fe, Co or Ni, wherein the carbon structures surround the metal particles.

The cathode material produced with this method has a different micro-structure and composition than the previously known materials, as shown with the exemplary embodiments. This new type of composition for the cathode material is a precondition for good reversibility of a fluoride-based conversion electrode.

Surprisingly, it has turned out that when using the cathode material according to the invention in a lithium-ion battery, a specific capacity of 250 to 300 mAh/g and a stable battery behavior could so far be observed over a period of 200 charging and discharging cycles at room temperature, as compared to the aforementioned prior art as well as to iron which does not form an alloy with lithium. It could thus be demonstrated that the expensive test arrangements known from the prior art and the use of CVD processes are not necessary for producing a nanocomposite having advantageous properties as electrode material in fluoride-based batteries, as compared to the prior art.

The elements according to the invention can advantageously be used as cathode material for fluoride-based conversion electrodes in alkali-metal ion batteries, in particular in lithium or sodium ion batteries.

The invention in particular has the advantages mentioned in the following.

A material which exhibits a noticeably more stable cycle behavior at room temperature with simultaneously high capacity was developed for use in electrodes that are based on metal fluorides. The close mixture of conductive carbon materials, meaning carbon nanotubes (CNT) and carbon nanofibers (CNF), nano-porous carbon materials or graphite nanocarbon materials with the transition material and/or its fluoride resulted in essential advantages. The easy production of this material with the aid of a thermal process represents a further advantage.

The invention is explained in further detail in the following with the aid of embodiments and the accompanying Figures.

GENERAL PRODUCTION METHOD

Figure 1:
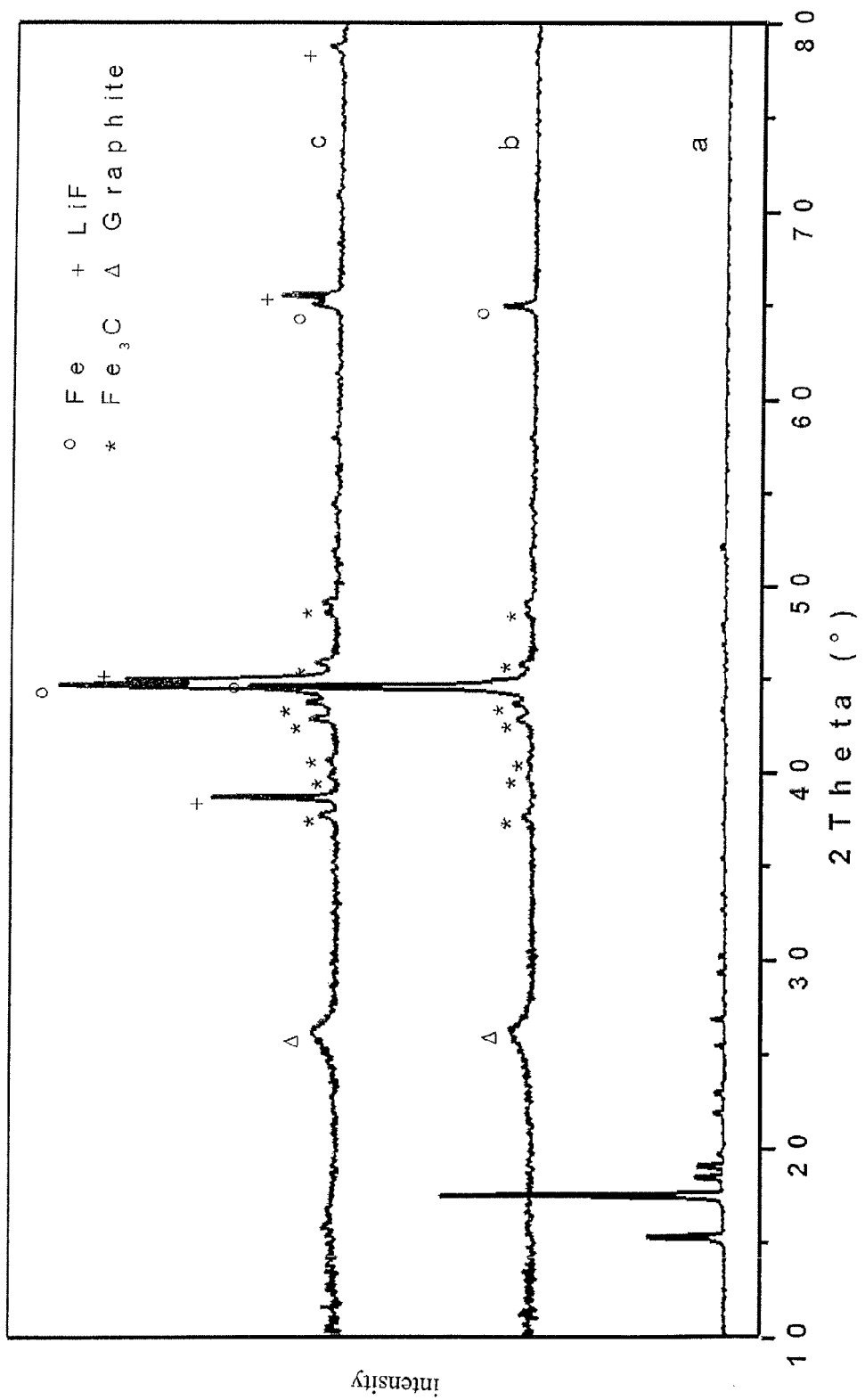
FIG. 1 shows X-ray diffractograms used in explaining the invention.

Finely pulverized metallocene and lithium fluoride (LiF) materials were initially dried under vacuum conditions and at temperatures that preferably ranged from 100° C. to 200° C. For a better mixing of the two starting materials, a ball grinder was used with a grinding time of between 15 minutes and 12 hours and a ball-to-powder mass ratio of >50:1.

The thermal treatment step took place in an inert gas atmosphere, in a closed, pressure resistant stainless steel tube which was placed into a tube furnace. Following this, the temperature was raised with a heating rate of preferably 2-10 K/min to temperatures of 600° C. and 800° C. and this temperature was maintained for 1-6 hours. Alternatively, the reactor was inserted into the previously heated-up furnace.

1. Production of a Fe-Based Carbon Nanocomposite (Example 1)

For this operation, ferrocene ground in a mortar was filled into the aforementioned tube reactor, sealed under an Ar atmosphere, and inserted at room temperature into the tube furnace. Following the heating up to 700° C., the reaction mixture was kept for another 2 hours at 700° C. The reactor was then removed, allowed to cool down over a period of approximately 2 hours to room temperature, and was subsequently opened in a glove box filled with argon, wherein gaseous, carbon-containing reaction products also leaked out. The material yield was 85-90%, relative to the mass of the starting materials. The carbon content of the composite amounted to 60.2±0.5 weight %, determined with the aid of the elemental analysis.

2. Production of a Fe/LiF Based Carbon Nanocomposite (Example 2)

In the same way as for the example 1, mixtures of ferrocene and finely pulverized LiF powder were processed inside a closed system for 2 hours at 700° C. The product yield was 94-95%, relative to the mass of the starting material. The carbon content was determined to be 42.1±0.5 weight %.

3. Production of a Fe/LiF-Based Carbon Nanocomposite Using Direct Heating

Alternatively, the product according to the example 2 was produced by inserting the reactor, containing the reaction mixture of 0.9 g ferrocene and 0.34 g LiF, directly into the hot 700° C. furnace and by maintaining the mixture at this temperature for 2 hours. The yield was 92-95%, relative to the starting material mass. The carbon content of the composite was 41.9±05 weight %.

4. Production of a Fe/LiF-Based Carbon Nanocomposite with the Aid of a Starting Mixture Ground in a Ball Grinder (Example 4).

For this example, the starting mixture according to the example 2 was initially ground inside a grinding bowl of hardened steel, using hardened steel balls, wherein the ball-to-powder mass ratio was 370:1. X-ray diffractometer recordings showed that the starting materials were only mixed as a result of this treatment, but that no decomposition or material conversion could be detected. The mixture ground in this way was filled into the reactor, the reactor was sealed, and the mixture was then subjected to the same treatment as described for the example 2. The material yield following the grinding in a ball grinder and the heating step was 88%, relative to the starting material mass. The carbon content was 41.8±0.5 weight %.

Structural Characterization of Fe-Based and/or Fe/LiF-Based Carbon Nanocomposites FIG. 1 shows X-ray diffractograms (XRD) of the composites and starting mixtures under inert conditions, wherein these were recorded for characterizing the Fe-based and/or Fe/LiF-based carbon nanocomposites. Diffractogram a in FIG. 1 shows the XRD of pure ferrocene, diffractogram b in FIG. 1 shows the XRD of a fe-based carbon nanocomposite according to the example 1, diffractogram c in FIG. 1 shows the XRD of a Fe/LiF-based carbon nanocomposite that was produced according to the example 2. All images were recorded at room temperature. In diffractograms b and c $Fe_3C$ phases also occur in addition to the Fe and LiF phases while no oxidic phases can be detected. Furthermore, there are no indications of a thermally induced decomposition of LiF.

The microstructure of the material was examined using techniques from the electron-microscopy such as HR-TEM, bright field (BF) and dark field (DF), as well as selected area electron diffraction (SAED). For this, powder samples were dispersed in waterless pentane, a few drops are dropped onto a carbon carrier and dried for at least 2 hours in the glove box under an Ar atmosphere. The samples were moved under inert gas to the microscope and were inserted therein following a brief contact with air.

Figure 2A:
FIGS. 2a and 2b show recorded images of nanocomposites made according to the method of the invention.
Figure 2B:
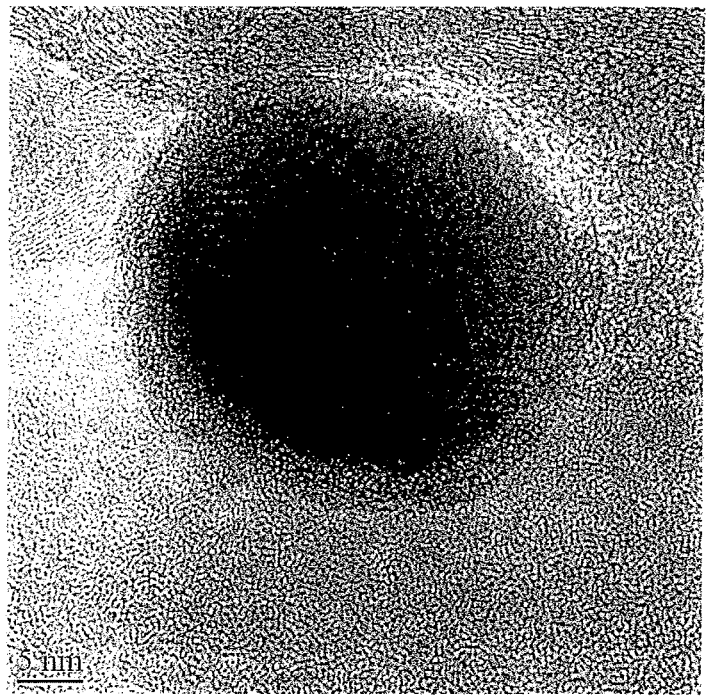

FIGS. 2a and 2b show the recorded images of the composites, the partially twisted forms of hollow structures of a graphite nanocarbon with therein embedded Fe nanoparticles having grain sizes ranging from 2 nm to 20 nm. Detailed images taken with a higher resolution verify that the Fe particles are always surrounded by a graphite carbon sleeve.

Electrochemical Analyses

Electrochemical properties of the nanocomposites were analyzed with the aid of 2-electrode cells of the type Swagelok. The positive electrode was produced by mixing Fe/LiF-based carbon nanocomposites with PVDF copolymer as a binder which represents, for example, a share of 10% of the total mixture. The pure nanocomposite was alternatively used without the admixture of a binder. Pure lithium was used for the negative electrode while a layer of glass fiber paper functioned as the separator. Used for the electrolyte was a 1:1 mixture of ethylene carbonate and dimethyl carbonate, with therein dissolved 1M $LiPF_6$. A battery tester was used to measure the charging and discharging cycles at a constant current.

Electrochemical Analysis of the Fe/LiF-Based Carbon Nanocomposite

For the electrochemical characterization of the Fe/LiF carbon nanocomposite according to the Example 2, a number of test cells were tested at room temperature over a longer period of time, at 20.83 mA/g (C/50) between 4.3 and 0.5V.

Figure 3:
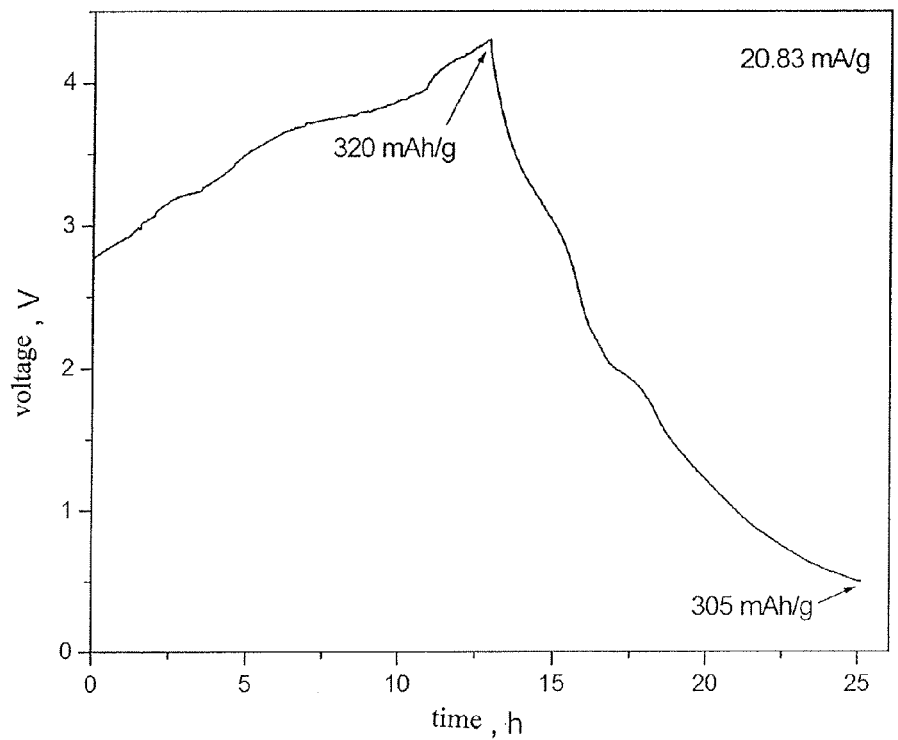
FIG. 3 is a graph showing a charging and discharging operation of a nanocomposites made according to the method of the invention.

FIG. 3 shows the first charging and discharging operation of a Fe/LiF-based carbon nanocomposite in the potential range of 4.3 to 0.5V, at a current density of 20.83 mA/g and measured at room temperature. It follows from this that the reaction is reversible, with a specific capacity of 320 and/or 305 mAh/g, corresponding to 46% of the theoretical capacity of the $Fe/FeF_3$ reaction. The illustrated curve contains three plateaus, giving rise to the conclusion that the reaction takes place in three redox steps [reduction-oxidation], which run down sequentially. A XRD image recorded of the material at the end of the first cycle shows that the composition is nearly identical to that of the starting material.

Figure 4:
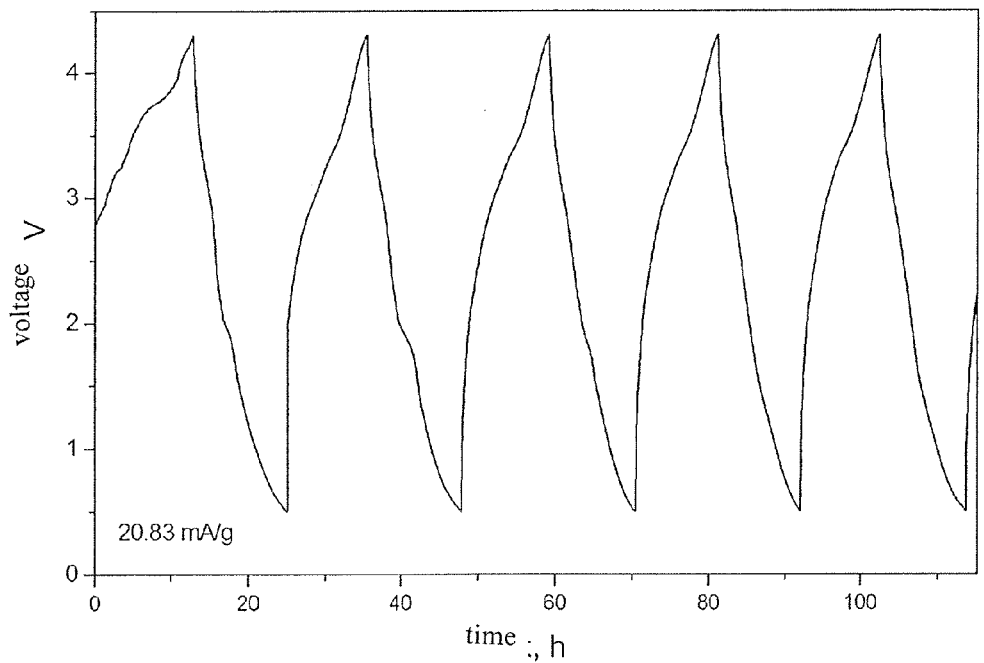
FIG. 4 is a graph showing cycle stability of an exemplary nanocomposite.

To analyze the cycle stability of the nanocomposite according to the Example 2, the battery was meanwhile cycled with C/50 at room temperature for more than 140 cycles, wherein the first five cycles are shown in FIG. 4 to better illustrate the details. The voltage measured at room temperature was 4.3 to 0.5V with a current density of 20.83 mA/g.

Figure 5:
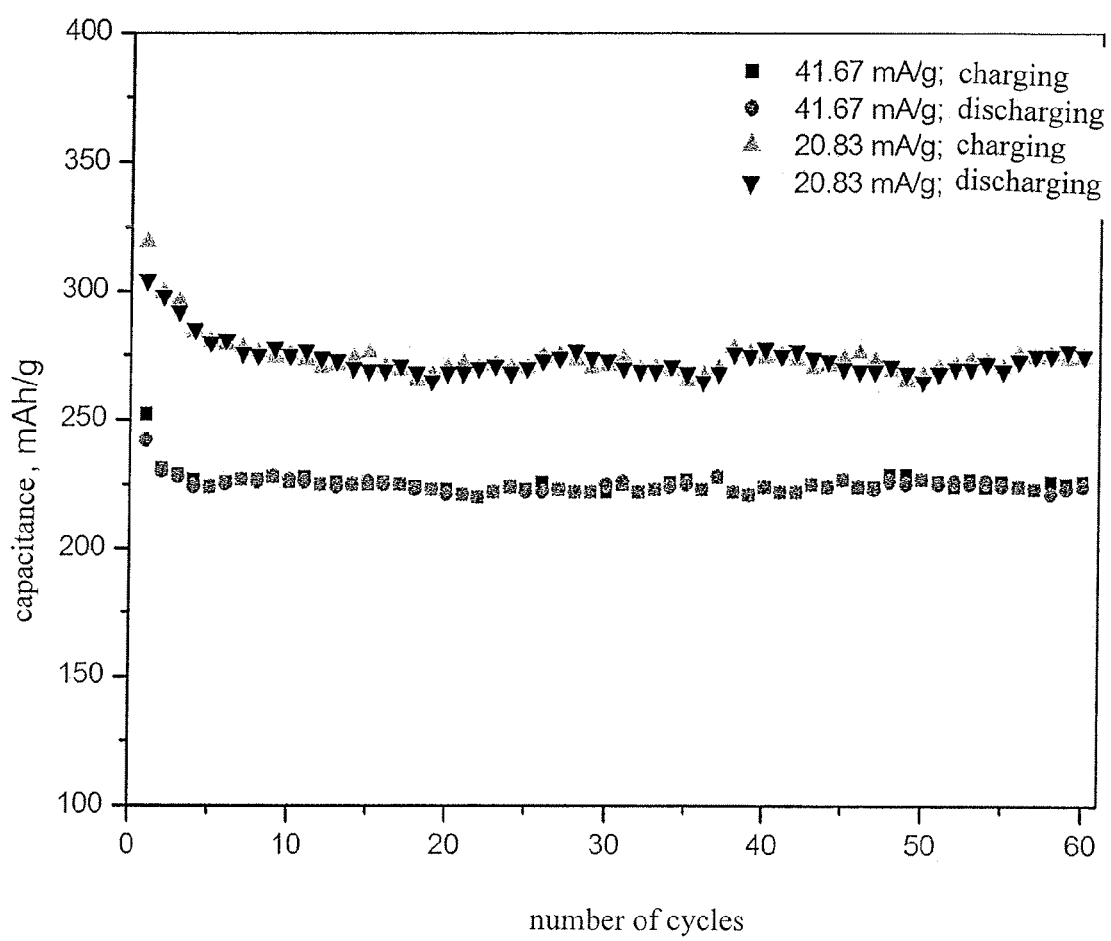
FIG. 5 is a graph showing specific charging and discharging capacity of an exemplary nanocomposite made according to the invention over a number of cycles and for different current intensities.

FIG. 5 shows the course of the specific charging and discharging capacity of a Fe/LiF carbon nanocomposite as a function of the cycle number over the first 60 cycles and for different current intensities. The voltage was 4.3 to 0.5V at a current density of 20.83 mA/g, measured at room temperature. It is obvious from this that even after 60 cycles the nanocomposite has a stable reversible capacity of 280 mAh/g. Following an initial decline in the capacity during the first cycles, the capacity remains stable over the complete measuring interval. Charging and discharging cycles measured at higher currents (C/20) show that the material can be cycled with high stability even at room temperature, which is in contrast to the known prior art.

Also analyzed was the reversible behavior of the material at lower and higher charging currents between 10.42 mAh/g (C/100) and 1.05 Ah/g (1C). FIG. 5 shows that the capacity drops with increasing C-rate, an effect that is generally observed in batteries. However, the cycle stability remained the same independent thereof.

The invention claimed is:

1. A cathode material for fluoride-based conversion electrodes, comprising: a matrix of graphite nanocarbon containing carbon structures, a dispersion of alkali metal ions, fluoride ions and metal nanoparticles with maximum particle sizes of 20 nm, wherein the carbon structures surround the metal nanoparticles, and wherein the metal nanoparticles are obtained by a metal and an organic compound comprising a metallocene during a single thermal treatment.

2. The cathode material according to claim 1, wherein the alkali metal ions comprise lithium ions or sodium ions.

3. The cathode material according to claim 1, wherein the matrix of graphite nanocarbon comprises a multi-walled nanocarbon material.

4. A method of making an alkali metal ion battery, comprising utilizing a cathode material according to claim 1, for a fluoride-based conversion electrode in the alkali metal ion battery.

5. A method for producing a cathode material for a fluoride-based conversion electrode that comprises a matrix of graphite nanocarbon containing carbon structures, a dispersion of alkali metal ions, fluoride ions and metal nanoparticles with maximum particle sizes of 20 nm, wherein the carbon structures surround the metal nanoparticles comprising: heating a metal and an organic compound during a single thermal treatment step until the organic compound is decomposed; and adding an alkali metal fluoride either before or after the thermal treatment step to the organic compound, wherein the metal and organic compound in the heating step comprise a metallocene.

6. The method according to claim 5, wherein the adding step includes mixing in the metal fluoride through grinding in a ball grinder.

7. The method according to claim 5, wherein the metal fluoride comprises lithium fluoride or sodium fluoride.

8. The method according to claim 5, wherein the metallocene includes a transition metal.

9. The method according to claim 5, wherein the heating step includes thermally decomposing the metallocene with a metal fluoride at a temperature ranging from about 600° C. to about 800° C. inside a sealed reaction container.

10. The method according to claim 5, wherein the metal and organic compound comprise a dispersion of a metal salt in a matrix of an organic compound.

11. The method according to claim 10, wherein the metal and organic compound comprise a dispersion of a metal salt in a matrix composed of a polymer, a monomer or a biological material.

* * * * *